L. R. LEMOINE.
GAS BURNER FOR PIPE MOLDS.
APPLICATION FILED NOV. 21, 1918.

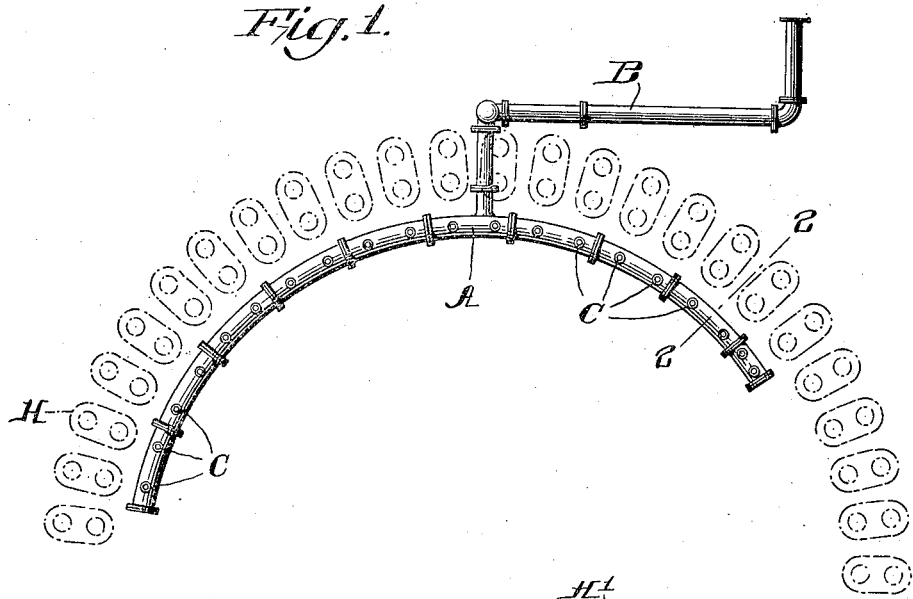
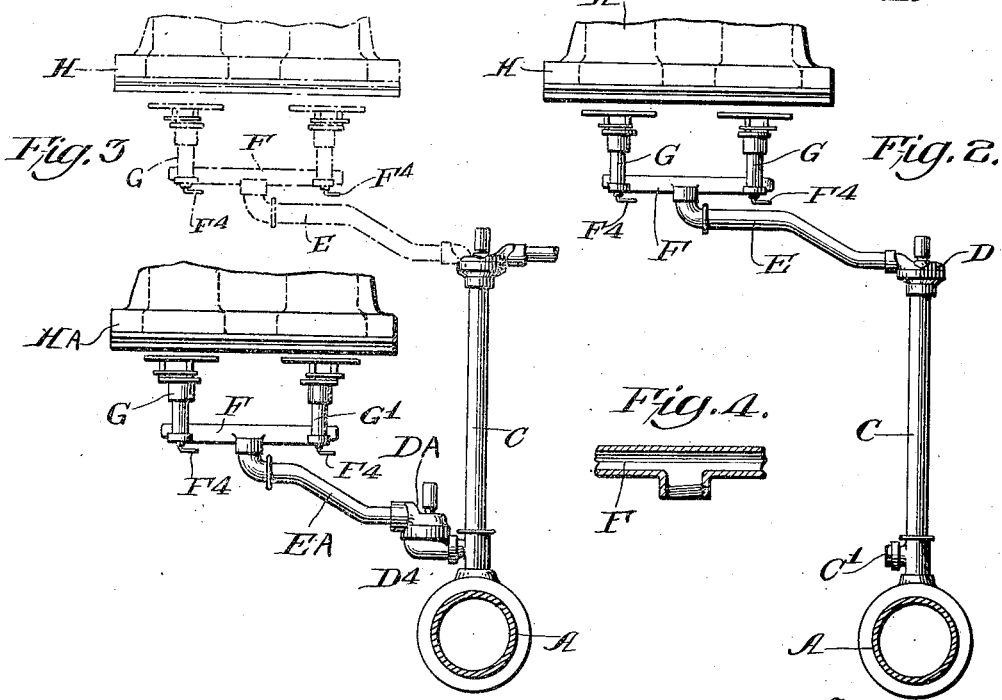

1,351,770.

Patented Sept. 7, 1920.
2 SHEETS—SHEET 2.

Inventor
Louis R. Lemoine
By Francis T. Chambers
his Attorney

UNITED STATES PATENT OFFICE.

LOUIS R. LEMOINE, OF PHILADELPHIA, PENNSYLVANIA, ASSIGNOR TO UNITED STATES CAST IRON PIPE & FOUNDRY COMPANY, OF BURLINGTON, NEW JERSEY, A CORPORATION OF NEW JERSEY.

GAS-BURNER FOR PIPE-MOLDS.

1,351,770.  Specification of Letters Patent.  Patented Sept. 7, 1920.

Application filed November 21, 1918. Serial No. 263,484.

*To all whom it may concern:*

Be it known that I, LOUIS R. LEMOINE, a citizen of the United States, and a resident of the city and county of Philadelphia and State of Pennsylvania, have invented certain new and useful Improvements in Gas-Burners for Pipe-Molds, of which the following is a true and exact description, reference being had to the accompanying drawings, which form a part thereof.

My present invention consists in improvements in a gas burner and the supply piping therefor, especially devised with the object of providing simple, compact and effective means for drying vertical pipe molds.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of my invention.

Of the drawings:

Figure 1 is a diagrammatic representation of a portion of a pipe molding plant with parts broken away and removed.

Fig. 2 is a partial sectional elevation, the section being taken on the line 2—2 of Fig. 1.

Fig. 3 is a view similar to Fig. 2 illustrating a modified construction.

Fig. 4 is a section of the portion of the apparatus shown in Fig. 2.

Figure 7:
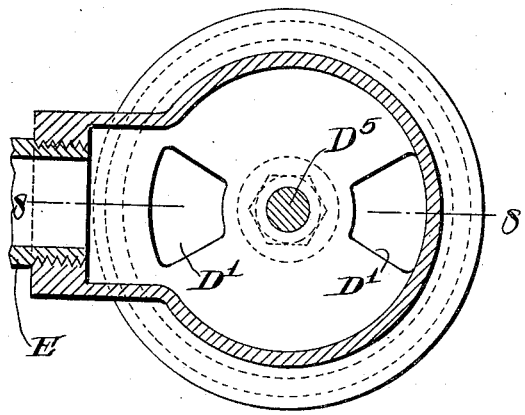
Fig. 7 is a section of one of the gas supply valves, the section being taken on the line 7—7 of Fig. 8.
Figure 5:
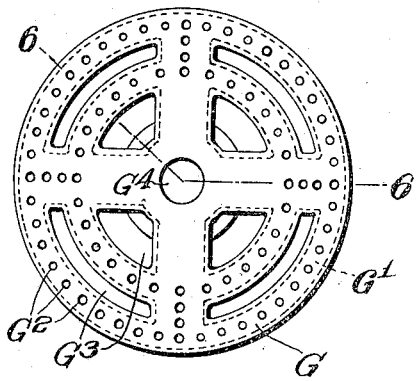
Fig. 5 is a plan view of one of the burner heads.
Figure 8:
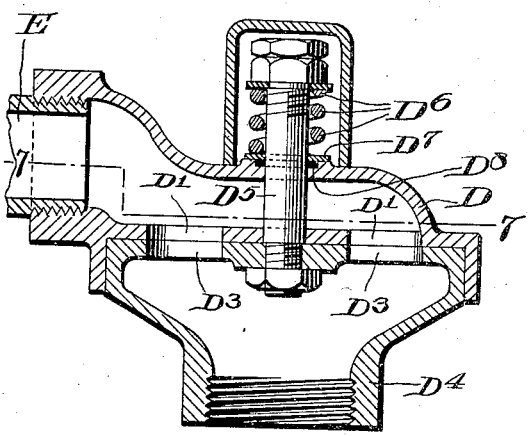
Fig. 8 is a section taken on the line 8—8 of Fig. 7.
Figure 6:
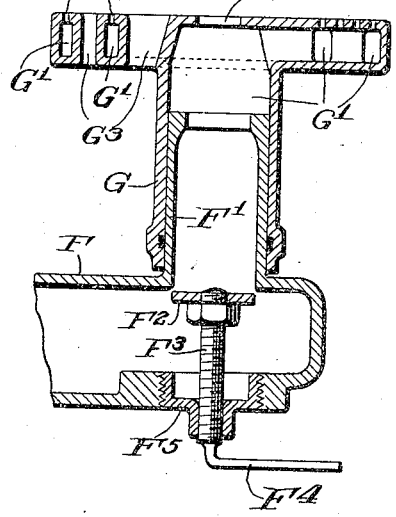
Fig. 6 is a section on the line 6—6 of Fig. 5.

In the pipe molding plant partially shown diagrammatically in Fig. 1, there are a circular series of vertically disposed double pipe molds H. These molds may be suspended from the wall of the pipe pit, or may be suspended at the periphery of a pipe molding turntable, each of these arrangements being well known and in common use in the pipe molding art. At a level below the lower end of the pipe molds is an arc shaped gas supply pipe A, which, as shown, is closed at its ends and receives combustible gas through a main B. Rising from the arc shaped pipe A are a series of vertical branch pipes C, one radially inward from each of the pipe molds H alongside the pipe A. At the top of each pipe C is a valve D. As shown in Figs. 7 and 8, the valve D comprises a chambered body with a flat underside in which inlet ports D' are formed. The flat underside of the valve member D bears against the flat upper side of a chambered end member $D^4$ threaded on the upper end of the corresponding branch pipe C. In the flat upper side of the end member $D^4$ ports $D^3$ are formed. The valve member D is journaled on the end member $D^4$ by means of a bolt $D^5$ passing through both the top and bottom walls of the valve member D, and anchored at its lower end in the top wall of the end member $D^4$. A spring $D^6$, interposed between a nut on the upper end of the bolt $D^5$ and a washer $D^7$ bearing against the upper side of the valve member D holds the valve member snugly against the end member $D^4$. As shown, the spring $D^6$ also serves to compress a packing $D^8$ surrounding the bolt $D^5$, and arranged in a depression or groove formed in the upper side of the valve member D above the bolt $D^5$. The upper edge of this packing is engaged by the washer $D^7$. When the valve and end member parts D and $D^4$ are in the relative positions shown in Figs. 2, 7 and 8 the ports D' and $D^3$ register and gas may pass from the pipe C through the valve D to the pipe E connected to the valve member D at one side of the latter. When the valve member D is turned relative to the end member $D^4$ about the bolt $D^5$ as an axis, the ports D' are moved out of register with the ports $D^3$, and the flow of gas through the valve is interrupted.

The free end of the pipe E is upturned and is connected to the underside of a horizontal chambered member F at points midway between the ends of the latter. Preferably, the member F is capable of angular adjustment about the upturned end of the pipe E to which it is connected. With the gas pressures employed, however, it is not necessary to provide a special swivel joint connection to permit of this adjustment. A simple threaded connection between the pipe E and the member F, illustrated in Fig. 4, permits the necessary adjustment of the member F with respect to the pipe E. Gas burners G are mounted on the upper side of each chambered member F, one at each end of the latter. As shown, each burner G comprises a lower sleeve portion which telescopes over a tubular portion F' of the member F. Each burner G is formed with a burner head having gas channels G', gas ports G² and air channels G³ arranged in a well known manner.

To permit of an independent adjustment of the gas passing to each burner head I advantageously provide a gas throttling device for each burner. As shown, this throttling device consists of a disk F² coaxial with the corresponding tubular part F' and carried at the upper end of a screw threaded spindle working in a nut F⁵ threaded in an opening formed in the under side of the member F. The lower end of the spindle F³ carries a handle F⁴ by means of which the spindle may be rotated to move the disk F² toward or away from the lower open end of the corresponding tubular part F' to thereby throttle more or less the gas outlet through the tubular part F'.

With the construction described a series of pipe molds arranged, as shown in Fig. 1, are dried by swinging the arms E into the position in which one burner is below a corresponding one of each of the pipe mold cavities H' of the molds to be dried. This brings the ports D' of each valve member D into register with the ports D³ in the end member D⁴ on which the valve member is journaled. The gas issuing from each burner is ignited and the mold is dried by the resulting gas flame passing upward into the corresponding mold cavity. When the molds are sufficiently dried the pipes E are swung around to carry the burners G out from under the pipe molds. This cuts off the supply of gas to the burners by moving the valve ports D' out of register with the corresponding end member ports D³; it also gets the burners out of a position in which they might interfere with the insertion of core bars in the molds, or the manipulation of the chill plates which close the lower end of the mold cavities during the casting operation.

The arrangement described obviously tends to a uniform distribution of gas to the different burners and the exact desired distribution to the different burners may be obtained by adjusting the various throttling devices F². It is desirable to have each burner in axial alinement with the corresponding mold cavity, and in case the axes of the two mold cavities of a double mold do not lie in the same radial plane this may be compensated for by a slight angular adjustment of the chambered member F about the upturned end of the corresponding pipe E. When, as is frequently necessary, it is desired to use the same driers with pipe molds of different lengths this may be readily accomplished by providing each branch pipe E with a plurality of sets of burners located at different levels, as shown in Fig. 3, wherein a second valve member DA is connected to the pipe C adjacent the lower end of the latter. The valve member DA proper may be identical in construction with the valve member D, described above, and the member D⁴, on which the valve member DA is mounted, differs from the member D⁴ of the construction first described only in being provided with a lateral opening instead of an opening in its bottom for connection to the pipe C. As shown, the member D⁴ is connected to the portion C' of the T connecting the pipe C to the pipe A. As shown in Fig. 2, the T portion C' is closed by a suitable plug. The pipe EA, connected to the outlet of the valve member DA, differs from the pipe E, only in being slightly shorter. The hollow member F, secured to the upper end of the pipe EA, and the burners G, carried by the member F, may be identical with the member F and burners G supported by the pipe arm E. With the construction shown in Fig. 3, the valve members DA, and parts carried thereby, are thrown into their operative positions, and then used to dry out pipe molds HA, having their lower ends at a level a little above the tops of the corresponding burners G. In this use of the apparatus the burner supporting arms E are swung into the inoperative position as indicated in full lines in Fig. 3. When shorter pipe molds are to be dried out the burner supporting arms E are swung into operative position and the arms EA are turned into the inoperative position.

While in accordance with the provisions of the statutes I have illustrated and described the best forms of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features of the invention.

Having now described my invention, what I claim as new and desire to secure by Letters Patent, is:

1. A pipe mold drying apparatus comprising means for supporting a multiple number of pipe molds, a gas main, a multiple number of gas delivery pipes leading therefrom, valves connected to said delivery pipes each comprising a fixed member secured to a pipe and a pivoted member turning thereon, and burner supporting pipes connected to the pivoted valve members and rotatable from a position in which the burner registers with a mold to a non-registering position, said valve members being so arranged as to open when the burner pipes are in registry with a mold and close when they are rotated away from such position.

2. A pipe mold drying apparatus comprising means for supporting a multiple number of pipe molds, a gas main, a multiple number of gas delivery pipes leading therefrom, valve members pivotally connected to said pipes to turn about vertical axes, and each formed with a thoroughfare opened and closed by turning the valve member about its axis, burner supporting pipes connected to said valve members and projecting laterally from the axes thereof, hollow members pivotally supported on said burner supporting pipes, and one or more burners supported on each of said hollow members, said mechanism being so arranged and proportioned that in swinging the burner supporting pipes to bring the burners into operative position with the molds the valves are opened, and in swinging them away from such position the valves are closed.

3. A mold drying apparatus comprising means for supporting a multiple number of pipe molds, a gas main, a multiple number of gas delivery pipes leading therefrom, valves connected to said delivery pipes each comprising a fixed member secured to a pipe and a pivoted member turning thereon, burner supporting pipes connected to the pivoted valve members and rotatable from a position in which the burner registers with a mold to a non-registering position, burners supported on said pipes, regulating valves for each burner, said valve members being so arranged as to open when the burner pipes are in registry with a mold and close when they are rotated away from such position.

4. A pipe mold drying apparatus comprising means for supporting a multiple number of pipe molds, a gas main, a multiple number of gas delivery pipes leading therefrom, a plurality of valves connected to each of said delivery pipes at different levels, each valve comprising a fixed member and a rotatable member, burner supporting pipes connected to each rotatable valve member, those connected to valves on the same delivery pipes extending at different levels, burners supported on said supporting pipes, said valves being arranged so as to open when the burners are turned to operative position.

LOUIS R. LEMOINE.